United States Patent [19]

Dumont

[11] 4,310,728
[45] Jan. 12, 1982

[54] RINGING DEVICE FOR A PRIVATE AUTOMATIC BRANCH EXCHANGE

[75] Inventor: Alain G. Dumont, Saint-Vallier, France

[73] Assignee: Jeumont-Schneider, Puteaux, France

[21] Appl. No.: 124,745

[22] Filed: Feb. 26, 1980

[30] Foreign Application Priority Data

Mar. 12, 1979 [FR] France ................ 79 06223

[51] Int. Cl.³ .......................................... H04M 19/02
[52] U.S. Cl. .............................. 179/18 HB; 179/84 R
[58] Field of Search ............. 179/18 HB, 84 R, 17 E, 179/18 F, 18 FA, 84 A, 99 R

[56] References Cited

U.S. PATENT DOCUMENTS

| 3,720,793 | 3/1973 | Hofman | 179/18 HB |
|---|---|---|---|
| 3,752,924 | 8/1973 | Freimanis | 179/84 R |
| 3,767,857 | 10/1973 | Colas et al. | 179/18 HB |
| 3,882,282 | 5/1975 | Picandet | 179/84 R |
| 3,917,909 | 11/1975 | Macrander et al. | 179/18 HB |
| 4,113,990 | 9/1978 | Nojiri et al. | 179/18 HB |
| 4,199,664 | 4/1980 | Grange et al. | 179/18 FA |
| 4,221,935 | 9/1980 | Barsellotti et al. | 179/17 E |

FOREIGN PATENT DOCUMENTS 2335222 1/1974 Fed. Rep. of Germany .
2368345 5/1978 France .
2382818 6/1978 France .

Primary Examiner—Gerald L. Brigance
Attorney, Agent, or Firm—Schwartz, Jeffery, Schwaab, Mack, Blumenthal & Koch

[57] ABSTRACT

A ringing device for a PABX comprising an alternating signal source and a direct current source connected to a supply line for supplying a ringing signal to subscriber lines. A centralized off-hook condition detection circuit is connected in series with the supply line and a switch, and in series with each subscriber's line is a local off-hook condition detection circuit and a bidirectional contact. At the time of any off-hook, the switch opens the alternating signal circuit, and the corresponding answering subscriber's line previously connected to the ringing signal supply line is connected to the switching network of the PABX before the switch recloses the circuit for supplying the ringing signal to the other called extensions.

6 Claims, 1 Drawing Figure

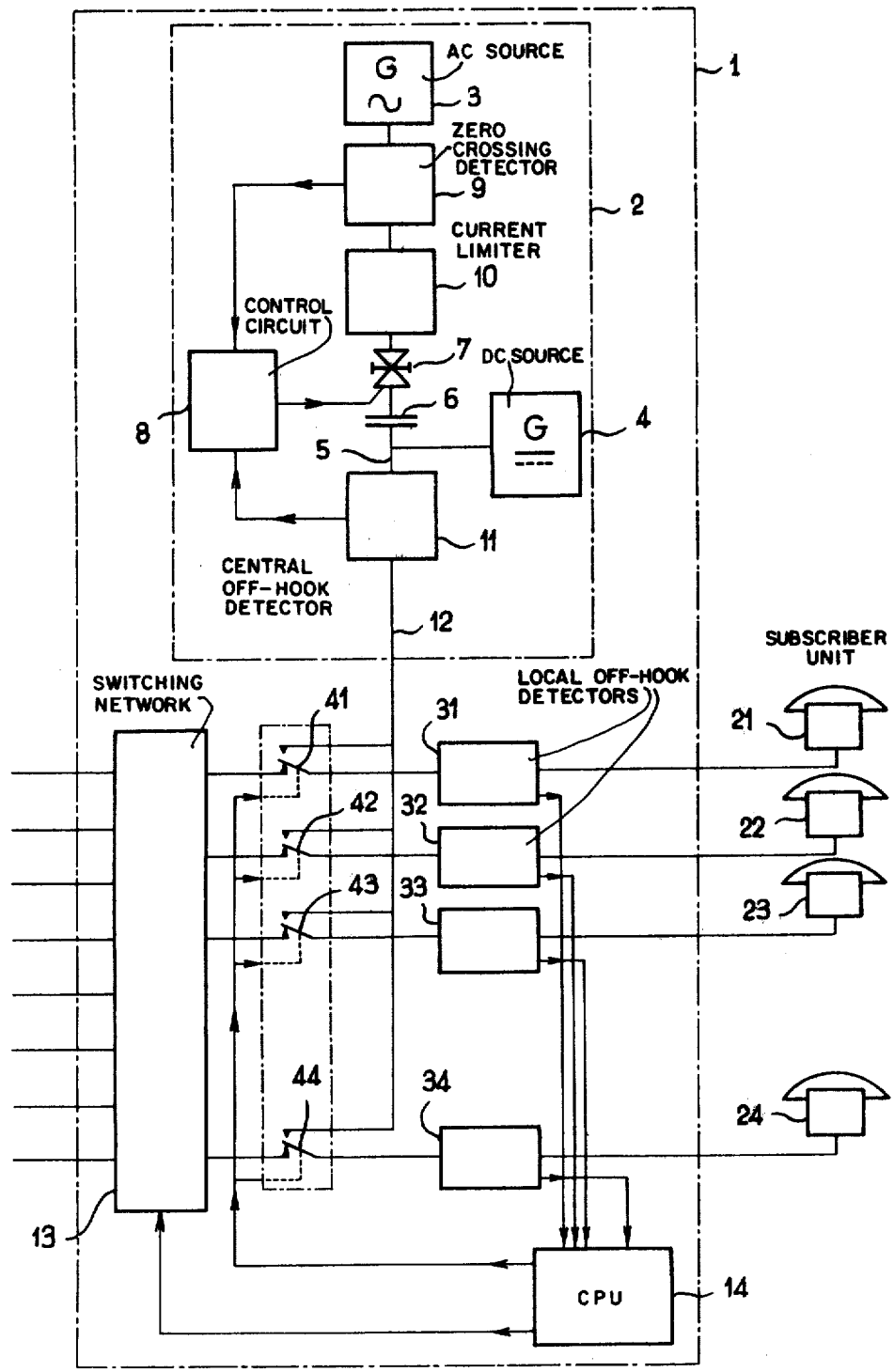

RINGING DEVICE FOR A PRIVATE AUTOMATIC BRANCH EXCHANGE

The present invention refers to a centralized ringing signal source or generator which may be employed especially in a a private automatic branch exchange (PABX) inter-connecting a plurality of subscriber's lines and more especially ringing device including such a source.

In general electronic PABX's include a centralized ringing signal generator of low-frequency alternating current but of relatively high voltage. This signal is applied selectively to the subscriber's station being called, after detection of the condition of the line, and is stopped as soon as the corresponding party being called has lifted his receiver.

Numerous patents, for example, the French Pat. Nos. 2,329,126, 2,366,756 and 2,368,845 propose various forms of such circuits. These devices, however, have the disadvantage of necessitating numerous electronic components, which increases their cost and substantially reduces their reliability of operation.

OBJECT AND SUMMARY OF THE INVENTION

The object of the present invention is to eliminate these disadvantages by means of a circuit of great simplicity. In accordance with the invention, there is provided a ringing device for a private automatic branch exchange interconnecting a plurality of subscriber units in a switching network and controlled by a central processing unit. The device comprises means for generating a ringing signal on a supply line to said subscriber units, a centralized off-hook detection circuit, a switching means, a plurality of local off-hook detection circuits and a plurality of bidirectional contact means. The means for generating a ringing signal includes an AC source and a DC source for generating respectively AC and DC circuits in said supply line. The centralized off-hook detection circuit is connected to the supply line and responsive to the DC current in the supply line for generating a centralized off-hook signal. The switching means receives the central off-hook signal and is operative for momentarily terminating the AC current in the supply line in response to the central off-hook signal thereby terminating the ringing signal in the subscriber units. One of the plurality of local off-hook circuits is associated with each of the subscriber units, and each local off-hook detection circuit detects an off-hook condition in the associated subscriber unit and generates a local off-hook signal to the central processing unit. One bidirectional contact means is associated with each subscriber unit and connects each subscriber unit to the switching network or alternately to the supply line. The central processing unit receives each of the local off-hook signals and is operative for selectively actuating each of the bidirectional contact means so that the subscriber unit is connected to the switching network when the associated subscriber unit goes off hook and the switching means simultaneously terminates the ringing signal. The subscriber unit is connected to the supply line when the associated subscriber unit is to be called.

BRIEF DESCRIPTION OF THE DRAWING

The invention will be better understood and other objects, advantages and characteristics will appear more clearly from reading the description which follows, with reference to the attached drawing in which the sole FIGURE is a general circuit diagram of a PABX including a ringing device in accordance with the invention.

DETAILED DESCRIPTION OF THE PREFERRED EMBODIMENT

In the FIGURE the PABX is represented within the dash-dot lines 1, and the centralized portion of the ringing device of the invention is represented in general within the dash-dot lines 2.

This centralized portion includes an alternating current generator 3 of low-frequency, generally of 50 Hz, and of relatively high voltage, for example, 70 volts, as well as a direct current generator 4 supplying, for example, 50 milliamps at 48 volts. These two currents are applied to the line 5. A capacitor 6 avoids flow of direct current towards the alternating current generator 3.

A bidirectional electronic switch 7 controlled by a control circuit 8 which includes an unstable or monostable trigger circuit (flip-flop) enabling on-off modulation of the alternating signal, for example, 3.3s of signal followed by 1.6s of release and so on, controls the application to the line 5 of the alternating ringing current. A zero-crossing circuit 9 enables the detection of the zero-crossing of the voltage of the alternating signal, so that the opening of the switch 7 occurs only when the voltage of the alternating signal is zero, which prevents the generation of parasitic (noise) signals in the circuit. For this purpose the output signal from the circuit 9 is applied to one of the inputs to the control circuit 8 of the switch 7.

Preferably a current limiting circuit 10 is inserted in the alternating signal circuit so as to limit the current generated in the event of short-circuit and to protect the various components of the device. A centralized loop detector 11 enables an off-hook condition to be detected, that is to say, the lifting of a receiver at a subscriber's line. Detector 11 in fact detects the flow of a direct current as, for example, at the time of the lifting of the receiver at a called extension. As soon as the flow of a direct current is detected in the supply lines 5 or 12, the detector 11 applies to the control circuit 8 of the switch 7 a signal which results in the opening of the switch 7 so that the ringing signal is no longer applied to the line 12. As soon as the ringing circuit of the extension being called is open, the detector 11 frees the control circuit 8 which then resumes its normal operation since the detector 11 no longer detects any direct current flow. The composite ringing signal is applied by way of the line 12 and bidirectional contacts to the subscriber's line to be called.

In order to simplify the FIGURE only four subscriber units or stations 21, 22,23 and 24 have been represented. Inserted in the subscriber's line to each of the stations are arranged a local off-hook detector—31,32,33,34—and a bidirectional contact—41,42,43,44—enabling each subscriber's line to be connected either to the supply line 12 in order to receive a ringing signal or to the switching network 13 at the time of an off-hook answer.

The central processing unit 14 which ensures the control of the switching network 13 in addition selectively controls the bidirectional contacts 41,42,43,44.

The operation of the device is then very simple. The centralized portion 2 operates continuously. When the central processing unit 14 receives through the dial numbering from a caller telephone station the order to call one of the subscriber's for example, the station 21, two possible results occur: either the station is busy or free. If the station is busy, the local detector 31 informs the central unit 14 that no ringing signal must be transmitted. The contact 41 then remains in its first state connected to the switching network, and the corresponding subscriber's line is not disturbed. The central unit 41 then causes the generation of a busy tone to the calling party.

If the station 21 being called is not busy the local off-hook detector 31 detects the free condition of the line, and the central unit 14 then controls the switching of contact 41. The corresponding subscriber's line is consequently connected to the line 12. In the absence of any off-hook, only the alternating signal is transmitted to the called station 21. This signal is suitably modulated by the circuits of the centralized portion 2. When the receiver at the station 21 is lifted, a direct current circuit path is provided which is immediately detected by the centralized detector 11. The latter then applies a signal to the control circuit 8 in order to open the switch 7 and consequently stop the application of the alternating signal to the line 12. The local detector 31 informs the central processing unit 14 of the off-hook condition of the corresponding station 21, and unit 14 then controls the switching of the contact 41 so as to disconnect the supply line 12 from the called subscriber's line which is then connected by the network 13, to the line of the calling party.

The flow of the direct current from the source 4 is consequently interrupted and the off-hook detector 11 informs the control circuit 8 of the switch 7 about it, and the latter is reclosed as soon as the voltage of the signal coming from the alternating current generator 3 passes through zero if the control circuit 8 authorizes it. At that instant the ringing signal is emitted again into the line 12, ready to be applied to any subscriber's line which is free and is called, by way of the corresponding bidirectional contact.

If a number of subscriber's are called simultaneously, the centralized loop detector 11 stops emission of the alternating ringing signal for all of the stations being called, when the receiver of one of the stations being called is off-hook since the centralized detector 11 then detects the flow of a direct current in the line 12. The supply of the ringing signal is then suspended whilst the cycle previously described is carried out. But since the bidirectional contacts 41 of the other called stations have not switched over during this time, the ringing signal is again applied to the stations being called of which the receivers have not been lifted, as soon as the switch 7 is reclosed.

The interruption of the supply of the ringing signal lasts about 30 to 40 milliseconds, which is not perceptible to the human ear.

Although only one embodiment of the invention has been described it is obvious that modifications may be made by one skilled in the art, and such modifications may still be within the spirit of the invention as defined by the appended claims. In particular, the alternating ringing signal may be of any type, for example, of high-frequency, low-voltage type if the extension stations are equipped with suitable amplifiers.

I claim:

1. A ringing system for use in a private automatic branch exchange interconnecting a plurality of subscriber units in a switching network and controlled by a central processing unit, said system comprising:
    (a) means for generating a ringing signal on a supply line to said subscriber units, said generating means including an AC source and a DC source for generating respectively AC and DC currents in said supply line,
    (b) a centralized off-hook detection circuit connected to said supply line and responsive to a DC current in said supply line for generating a central off-hook signal,
    (c) switch means receiving said central off-hook signal and operative for momentarily terminating said AC current in said supply line in response to said central off-hook signal thereby terminating said ringing signal,
    (d) a plurality of local off-hook detection circuits associated with each of said subscriber units, each of said local off-hook detection circuits detecting an off-hook condition in said associated subscriber units and generating a local off-hook signal to said central processing unit, and
    (e) a plurality of bidirectional contact means, each bidirectional contact means associated with one of said subscriber units and connecting said subscriber unit to said switching network or, alternately, to said supply line, said central processing unit receiving each of said local off-hook signals and operative to selectively actuate each of said bidirectional contact means whereby said subscriber unit is connected to said switching network when said associated subscriber unit goes off hook and said switch means simultaneously terminates said ringing signal and said subscriber unit is connected to said supply line when said associated subscriber unit is to be called.

2. A system as recited in claim 1, wherein said switch means automatically reconnects said AC circuit in said supply line after a relatively short time interval.

3. A system as recited in claim 2, wherein said time interval is between 30-40 milliseconds.

4. A system as recited in any one of claims 1, 2 or 3 further comprising a zero-crossing detector responsive to said AC source and operative for controlling said switch means for closing same for reconnecting said AC current to said supply line only at the zero-crossing of said AC current.

5. A system as recited in claim 4 further comprising a current limiter connected between said AC source and said switch means for limiting said AC current.

6. A system as recited in claim 1 further comprising a current limiter connected between said AC source and said switch means for limiting said AC current.

* * * * *